I. M. NOBLE AND W. E. GOSSLING.
STORAGE BATTERY.
APPLICATION FILED AUG. 26, 1918.
1,323,307.
Patented Dec. 2, 1919.
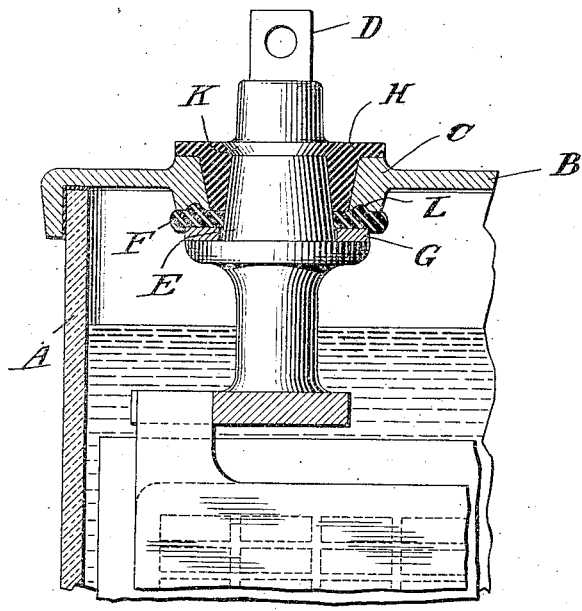
Fig. 1.
Fig. 2.
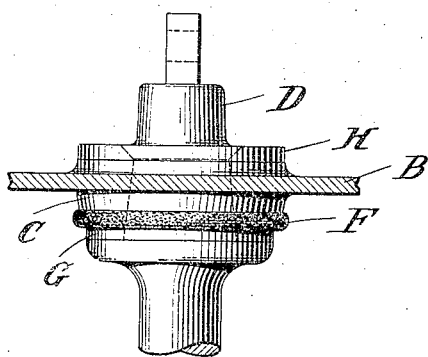
Irvine M. Noble
and Walter E. Gossling, Inventors
By their Attorneys,
Kerr Page Cooper & Hayward.

UNITED STATES PATENT OFFICE.

IRVINE M. NOBLE AND WALTER E. GOSSLING, OF INDIANAPOLIS, INDIANA, ASSIGNORS TO THE PREST-O-LITE COMPANY, INC., A CORPORATION OF NEW YORK.

STORAGE BATTERY.

1,323,307.  Specification of Letters Patent.  Patented Dec. 2, 1919.

Application filed August 26, 1918. Serial No. 251,358.

*To all whom it may concern:*

Be it known that we, IRVINE M. NOBLE and WALTER E. GOSSLING, both citizens of the United States, residing at Indianapolis, in the county of Marion and State of Indiana, have invented certain new and useful Improvements in Storage Batteries, of which the following is a full, clear, and exact description.

The invention upon which this application for Letters Patent is based, is an improvement pertaining to storage batteries and involves a new means for securing the terminal posts of the electrodes in the cover for the cell, whatever may be its material, but more especially when such covers are composed of insulating, poorly conducting or non-plastic substances.

For certain purposes exemplified in the glass jar assembly of storage batteries used for house lighting, the use of hard rubber covers has been almost universal, but such covers are not altogether satisfactory because they are apt, under even a relatively small increase in the temperature, to become somewhat flexible and sag thus forming an inadequate support for the battery elements, and because, under present market conditions, proper covers of this nature are difficult to obtain.

This has led us to the use of substitutes for hard rubber, such as porcelain, glass, or even cast antimony-lead, and other materials, which for practical reasons are necessarily such as will not be injuriously attacked by dilute sulfuric acid; but the adoption of any substance having electric conductive properties or incapable of being altered in form by dies or tools or otherwise fashioned when once molded and cooled, to meet the practical requirements of use when terminal posts are associated with them, has required us to devise a special means for uniting the said posts to the covers and securing a liquid tight and durable joint.

We have accordingly made the improvement on the means set forth and described in our former Patent No. 1,251,452, dated December 25th, 1917, which we shall now proceed to describe.

In the accompanying drawing,

Figure 1 is a view mainly in section of the corner of a storage battery cell showing one of the terminal posts made in accordance with our invention, and Fig. 2 is a view in elevation of said post the cell cover only being shown in section.

The side wall of the cell is indicated by A and the cover by B. At the points where a terminal post is to be passed through and united to the cover the latter is provided with a suitable perforation surrounded by properly thickened walls or bosses C.

D is a terminal post in electrical union with the plates of a given polarity. It has an enlargement or flange E to engage with the underside of the cover and is preferably made in generally tapering form up to the part which is united to the usual connection.

In applying this post, a gasket of relative soft or compressible material F is laid up against the edge of the opening in the cover, and a washer G of more rigid insulating material laid upon it. The post is then passed up through the opening and a bushing of insulating material H then passed down over the post.

The bushing H should be of such material as hard rubber. The gasket F should be of softer and more pliable material such as 40% Para rubber. While the washer G especially if the cover is of any conducting material should be of hard rubber.

When these parts are assembled in the manner described a suitable tool is heated and applied to the post or other means used to force out a flange K thereon and to cause it to sink into the bushing in such manner as to bind the lower flange E tightly against the washer G, maintain the gasket F under compression and at the same time force and hold the suitably shaped bushing into intimate contact with both post and cover. In order that this gasket may the more perfectly effect its intended purpose of securing a liquid tight joint, the under surface of the thickened boss C contains a groove L into which the gasket is forced.

In this manner an inexpensive and effective liquid tight joint is secured; and the post, even should the gasket F ultimately become impaired by use or under the action of the dilute acid, is well insulated from the cover.

We are aware that the mere interposition of an insulating sleeve, gasket or the like between a cover and a conducting post is not a matter of invention, but the peculiar exigencies of the storage battery art have offered many problems by no means easy of solution, in the matter of making and maintaining such joints in a practical manner. The means which we have above described have been found to fully answer this purpose.

What we claim is:—

1. The combination in a storage battery with a cell cover of rigid material of a terminal post extending through a hole therein, said post having thereon a flange below the cover, a flange formed integral therewith above the cover, an insulating bushing of hard material surrounding the post where it passes through the cover, and a gasket of yielding material between the lower flange and the edge of the hole in the cover, said gasket being compressed by the pressure of the upper flange on the bushing and the upward pressure of the lower flange into close union with the underside of the cover to form a tight joint.

2. In a storage battery, the combination with a cover of rigid material, of a terminal post extending through a hole therein and formed with flanges above and below the said cover, a bushing of hardened plastic insulating material, surrounding the post and overlying the edge of the hole through which the post extends, a gasket of yielding material between the under edge surface of the cover around the hole, a rigid washer below the gasket, the pressure exerted upon the bushing and the washer by the two flanges being such as to secure the post to the cover and force the soft gasket into firm union with the underside of the cover.

3. In a storage battery, the combination with a cover of rigid material of a terminal post extending through a hole with thickened edges therein, said post being formed with integral flanges above and below the cover, of a bushing surrounding the post, a gasket of yielding material underlying the thickened edge of the hole in the cover which is formed with a groove in its face, a washer interposed between the gasket and the lower post flange, said gasket being compressed into the groove and into intimate contact with the cover, and the bushing being forced into intimate contact with the cover, post and gasket by the pressure exerted by a suitable tool applied on the upper portion of the post.

4. In a storage battery the combination with a cover of rigid material, of a terminal post extending through a hole therein, said post being formed with integral flanges above and below the cover, and insulating material formed at least in part of yielding substance interposed between said cover and said post, the said insulating material being compressed into intimate contact with the cover and the post by the pressure exerted when the second of said flanges is formed by a suitable tool brought over the adjacent end of the post.

In testimony whereof we hereunto affix our signatures.

IRVINE M. NOBLE,
WALTER E. GOSSLING.